US012791840B2

(12) United States Patent
Tomita

(10) Patent No.: US 12,791,840 B2
(45) Date of Patent: Nov. 10, 2026

(54) OPTICAL SYSTEM HAVING LENS UNITS SYMMETRICAL WITH RESPECT TO DIAPHRAGM

(71) Applicant: Nippon Electric Glass Co., Ltd., Otsu (JP)

(72) Inventor: Mitsuru Tomita, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 247 days.

(21) Appl. No.: 18/683,024

(22) PCT Filed: Aug. 1, 2022

(86) PCT No.: PCT/JP2022/029462
§ 371 (c)(1),
(2) Date: Feb. 12, 2024

(87) PCT Pub. No.: WO2023/032551
PCT Pub. Date: Mar. 9, 2023

(65) Prior Publication Data

US 2024/0377621 A1 Nov. 14, 2024

(30) Foreign Application Priority Data

Aug. 31, 2021 (JP) ................................ 2021-141645

(51) Int. Cl.
*G01N 21/15* (2006.01)
*G01N 23/041* (2018.01)
(Continued)

(52) U.S. Cl.
CPC ........... *G02B 13/14* (2013.01); *G02B 5/1814* (2013.01); *G02B 7/021* (2013.01); *G02B 7/025* (2013.01);
(Continued)

(58) Field of Classification Search
CPC ........................ G02B 3/00; G02B 2003/0093; G02B 5/1814; G02B 7/021; G02B 7/025;
(Continued)

(56) References Cited

U.S. PATENT DOCUMENTS 4,812,021 A * 3/1989 Harrigan ................ G02B 15/22 359/679
5,282,083 A * 1/1994 Hall ....................... G02B 13/14 359/755
(Continued)

FOREIGN PATENT DOCUMENTS

JP 2002-131509 A 5/2002
JP 2007-094241 A 4/2007
(Continued)

OTHER PUBLICATIONS

International Search Report and Written Opinion for PCT/JP2022/029462 and its English translation thereof mailed Oct. 11, 2022.

*Primary Examiner* — Ryan S Dunning
(74) *Attorney, Agent, or Firm* — Harness, Dickey & Pierce, P.L.C.

(57) ABSTRACT

Provided is a lens unit that is for an infrared region and that allows occurrence of a tilt error to be easily suppressed. A lens unit (4) is a lens unit which is used for an infrared region that includes at least any one of wavelengths in a range of 7 μm to 14 μm, the lens unit including: a first lens (1) and a second lens (2). A circumferential edge part (1*c*, 2*c*) of at least one of the first lens (1) and the second lens (2) has a cutout part (1*d*, 2*d*), and the first lens (1) and the second lens (2) are integrated by an adhesive (12) that is introduced to the cutout part (1*d*, 2*d*).

19 Claims, 7 Drawing Sheets

(51) Int. Cl.

| | |
|---|---|
| ***G02B 3/00*** | (2006.01) |
| ***G02B 5/18*** | (2006.01) |
| ***G02B 7/02*** | (2021.01) |
| ***G02B 13/14*** | (2006.01) |
| *G01N 21/25* | (2006.01) |
| *G01N 21/35* | (2014.01) |

(52) U.S. Cl.
CPC ........... *G01N 21/15* (2013.01); *G01N 21/255* (2013.01); *G01N 21/35* (2013.01); *G01N 2021/3595* (2013.01); *G01N 23/041* (2018.02); *G02B 3/00* (2013.01); *G02B 2003/0093* (2013.01)

(58) Field of Classification Search
CPC ...... G02B 13/14; G01N 21/15; G01N 21/255; G01N 21/35; G01N 2021/3595; G01N 23/041
See application file for complete search history.

(56) References Cited

U.S. PATENT DOCUMENTS

| | | | | |
|---|---|---|---|---|
| 2007/0076309 | A1 | 4/2007 | Shimizu et al. | |
| 2015/0043001 | A1 | 2/2015 | Ishimaru | |
| 2017/0192132 | A1 * | 7/2017 | Takahashi ............... | C03C 3/321 |
| 2018/0180780 | A1 * | 6/2018 | Komori ................... | C03C 3/321 |
| 2018/0275378 | A1 * | 9/2018 | Suzuki ................. | G02B 5/1814 |
| 2020/0116977 | A1 | 4/2020 | Kajiyama et al. | |
| 2020/0158982 | A1 * | 5/2020 | Feng ...................... | G02B 7/026 |

FOREIGN PATENT DOCUMENTS

| | | | |
|---|---|---|---|
| JP | 5637488 | B2 | 12/2014 |
| JP | 2017-138563 | A | 8/2017 |
| JP | 2017-219745 | A | 12/2017 |
| JP | 2018-105905 | A | 7/2018 |
| JP | 2020-064165 | A | 4/2020 |
| JP | 2021-56271 | A | 4/2021 |
| WO | 2015/029645 | A1 | 3/2015 |

* cited by examiner

OPTICAL SYSTEM HAVING LENS UNITS SYMMETRICAL WITH RESPECT TO DIAPHRAGM

TECHNICAL FIELD

The present invention relates to a lens unit that is used for a spectral characteristic measurement device and the like.

BACKGROUND ART

Patent Literature 1 discloses a near-infrared spectral characteristic measurement device which includes an objective lens that collimates signal light from a specimen, a phase shifter that is provided in collimated light, and an imaging lens that causes an image of the specimen to be formed in a detecting section. Patent Literature 2 discloses an imaging system which includes an optical system (objective lens) that collimates light from an object, a plurality of imaging lenses that each cause an image to be formed in a detecting section with use of a part of collimated light, and filters that are provided to the respective plurality of imaging lenses. Patent Literature 2 also describes design of an objective lens for the visible region.

CITATION LIST

Patent Literature

[Patent Literature 1]
Japanese Patent No. 5637488
[Patent Literature 2]
Japanese Patent Application Publication Tokukai No. 2020-064165

SUMMARY OF INVENTION

Technical Problem

Incidentally, there is known absorption of an infrared region (for example, wavelengths of 7 μm to 14 μm) on a long wavelength side of the near-infrared region, which absorption is caused by a molecular vibration inherent in a substance. Under the circumstances, for further development of spectral measurement techniques, spectral characteristic measurement devices, such as a hyperspectral camera, are expected to be expanded to such an infrared region. However, a lens unit of a finite-type spectral characteristic measurement device from which a measurement target is located at a short distance has a problem that a deviation of an angle of mounting of a lens with respect to a lens barrel member (tilt error) tends to greatly affects optical properties, as compared with a lens unit of an infinite-type spectral characteristic measurement device from which a subject is located at a long distance.

In view of the above problem, the object of the present invention is to provide a lens unit that is for an infrared region and that allows occurrence of a tilt error to be easily suppressed.

Solution to Problem

In order to attain the above object, a lens unit in accordance with an aspect of the present invention is a lens unit which is used for an infrared region that includes at least any one of wavelengths in a range of 7 μm to 14 μm, the lens unit including: a first lens; and a second lens, wherein a circumferential edge part of at least one of the first lens and the second lens has a cutout part, and the first lens and the second lens are integrated by an adhesive that is introduced to the cutout part.

Advantageous Effects of Invention

A lens unit in accordance with an aspect of the present invention allows occurrence of a tilt error to be easily suppressed.

DESCRIPTION OF EMBODIMENTS

Embodiments

<Optical System>

Figure 1:
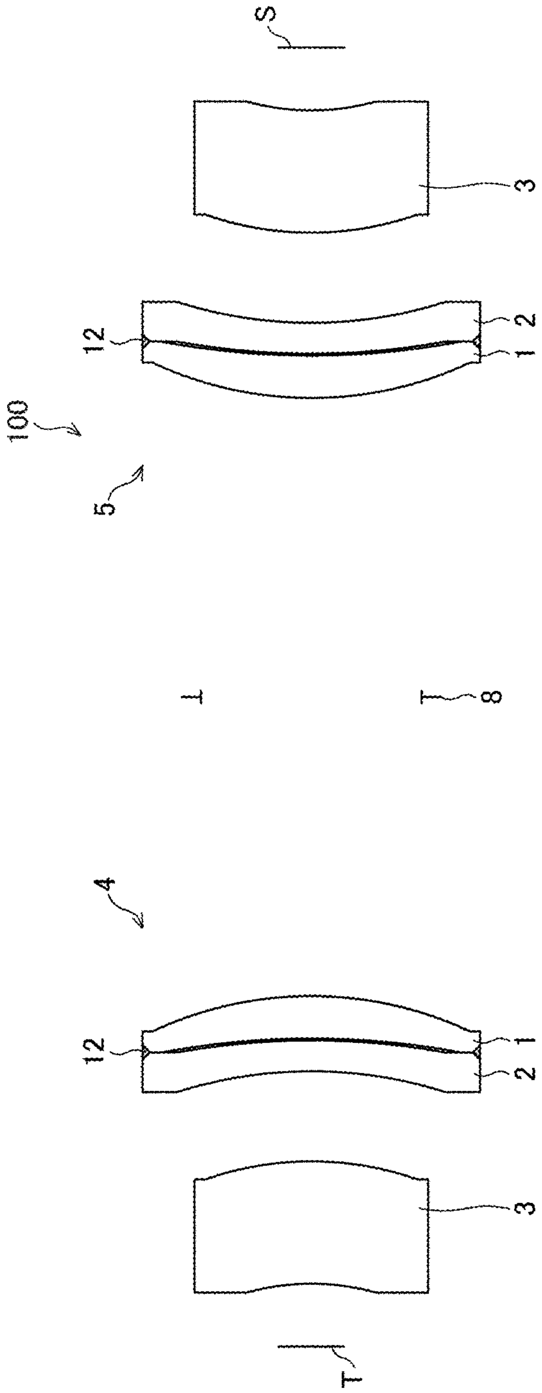
FIG. 1 is a cross-sectional view that illustrates a configuration of a main part of an optical system to which lens units in accordance with an embodiment are applied and that is along an optical axis.

FIG. 1 is a cross-sectional view that illustrates a configuration of a main part of an optical system 100 to which lens units in accordance with an embodiment are applied and that is along an optical axis. The optical system 100 is an optical system in which an image of an object plane T is formed on an image plane S on which an image sensor (detecting section) or the like that can be used in a wavelength range of an infrared region (7 μm to 14 μm) can be disposed. Note that the infrared region means a region of wavelengths from 7 μm to 14 μm, unless otherwise specified.

The optical system 100 includes (i) a first lens unit 4 and a second lens unit 5 which are lens units in accordance with an aspect of the present invention and (ii) a diaphragm 8. The first lens unit 4 is an objective lens, and collimates light that has entered the first lens unit 4 from an object plane T side. The first lens unit 4 is configured such that a first lens 1, a second lens 2, and a third lens 3 are disposed in order from a diaphragm 8 side toward the object plane T side.

The second lens unit 5 is an imaging lens that converges the collimated light on the image plane S, and has a configuration similar to that of the first lens unit 4. Specifically, the second lens unit 5 is configured such that a first lens 1, a second lens 2, and a third lens 3 are disposed in order from a diaphragm 8 side toward an image plane S side.

The second lens unit 5 has a configuration similar to that of the first lens unit 4. In the optical system 100, the second lens unit 5 is disposed so as to be symmetrical to the first lens unit 4 with respect to the diaphragm 8. The diaphragm for each of these lens units is located to a collimated light side of the first lens 1. In the optical system 100, the diaphragm 8 for each of the lens units is configured so as to be shared.

It is possible to apply the optical system 100 to a multi-spectral camera or a hyperspectral camera by, for example, disposing a filter or a phase shifter in a vicinity of the position of the diaphragm 8. Note that the optical system 100 does not need to include the diaphragm 8.

The optical system 100 has the lens units in accordance with an aspect of the present invention. Therefore, occurrence of a tilt error is easily suppressed. Thus, it is possible to suppress a decrease in modulation transfer function (MTF) which decrease is caused by occurrence of a tilt error, and possible to reduce the root mean square (RMS) radius of a concentrated spot on the image plane. Moreover, aberration is also suppressed. Furthermore, good resolution is achieved.

[MTF of Optical System]

The MTF in the wavelength range of 7 μm to 14 μm at a spatial frequency of 41.7 cycles/mm satisfies preferably not less than 0.35 and more preferably not less than 0.40 in an image circle. This configuration allows good resolution to be achieved on the image plane S. Note that the spatial frequency of 41.7 cycles/mm corresponds to a Nyquist frequency $f_N$ of an image sensor having a pixel pitch of 12 μm.

<Lens Units>

The lens units in accordance with an aspect of the present invention are described below. Since the second lens unit 5 has a configuration similar to that of the first lens unit 4, the first lens unit 4 is described, unless otherwise specified. Note that the first lens unit 4 may be referred to as "lens unit 4" and the second lens unit 5 may be referred to as "lens unit 5".

Figure 2:
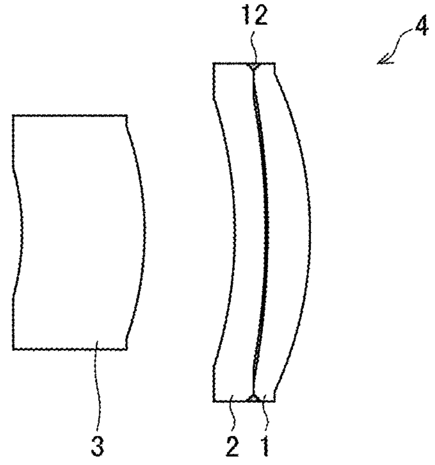
FIG. 2 is a cross-sectional view that illustrates a configuration of a main part of the lens unit in accordance with an embodiment and that is along the optical axis.
Figure 3:
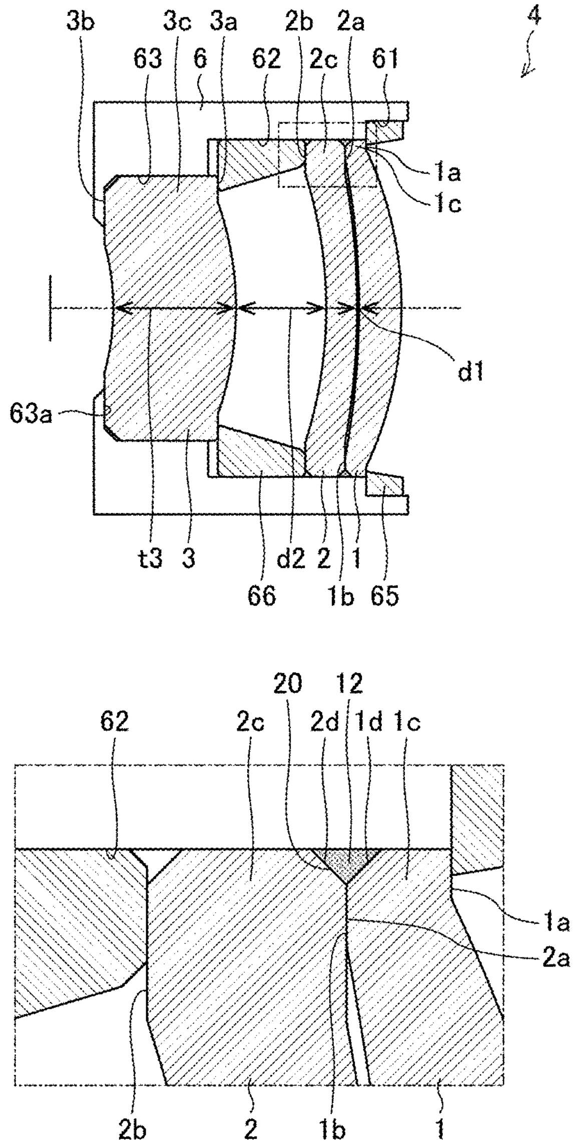
FIG. 3 is a cross-sectional view illustrating a state where the lens unit in accordance with an embodiment is accommodated and fixed in a lens barrel.
Figure 4:
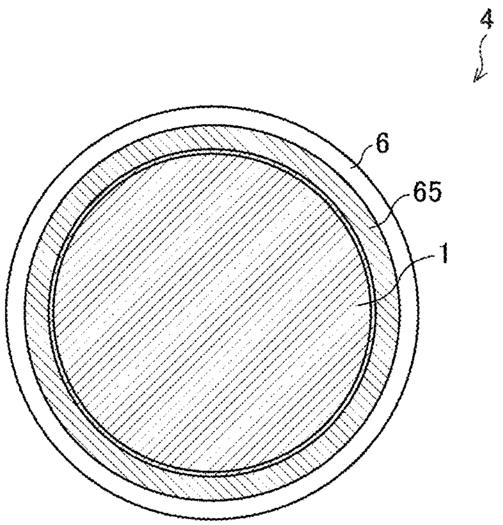
FIG. 4 is a front view illustrating the lens unit in accordance with an embodiment.

FIG. 2 is a cross-sectional view that illustrates a configuration of a main part of the lens unit in accordance with an embodiment and that is along the optical axis. FIG. 3 is a cross-sectional view illustrating a state where the lens unit in accordance with an embodiment is accommodated and fixed in a lens barrel. FIG. 4 is a front view illustrating the lens unit in accordance with an embodiment. The lens unit 4 includes the first lens 1, the second lens 2, the third lens 3, a lens barrel 6, a first ring part 65, and a second ring part 66. The first lens 1 and the second lens 2 are integrated by an adhesive 12.

The lens barrel 6 includes a first hole 61, a second hole 62, and a third hole 63. The first hole 61 is connected to the second hole 62, and has a diameter larger than that of the second hole 62. The second hole 62 is connected to the third hole 63, and has a diameter larger than that of the third hole 63. The third hole 63 has, on an aperture side, an edge part 63*a* that protrudes toward an axis.

The third lens 3 is fitted in the third hole 63. The second lens 2 and the first lens 1 are fitted in the second hole 62 in a state where the second ring part 66 intervenes between the second lens 2 and the third lens 3. The first ring part 65 that presses the first lens 1 is fitted in the first hole 61. The ring parts 65 and 66 cause the lenses to be located at respective given positions in the lens barrel 6 or fix the lenses at respective given positions on the optical axis in the lens barrel 6. Specifically, the first ring part 65 presses a circumferential edge part (first surface 1*a*) of the first lens 1 which circumferential edge part (first surface 1*a*) is not in contact with the second lens 2.

The lenses are fixed in a state where respective circumferential edge parts 1*c*, 2*c*, and 3*c* of the lenses are each in contact with the lens barrel 6 and/or at least one of the ring parts 65 and 66. Each of the circumferential edge parts 1*c*, 2*c*, and 3*c* is a region that includes a flange part, and includes a corresponding one of first surfaces 1*a*, 2*a*, and 3*a*, a corresponding one of second surfaces 1*b*, 2*b*, and 3*b*, and a lens end surface. Each of the circumferential edge parts 1*c*, 2*c*, and 3*c* may include a portion of an optical surface. In the present embodiment, the third lens 3 is fixed in a state where the second surface 3*b* is locked by the edge part 63*a* of the lens barrel 6 and the first surface 3*a* is in contact with the second ring part 66. The second lens 2 is fixed in a state where the second surface 2*b* is in contact with the second ring part 66 and the first surface 2*a* is in contact with the second surface 1*b* of the first lens 1. The first lens 1 is fixed in a state where the second surface 1*b* is in contact with the first surface 2*a* of the second lens 2 and the first surface 1*a* is pressed by the first ring part 65. That is, each of the lenses of the lens unit 4 is accommodated and fixed in the lens barrel 6 by being pressed from a first lens 1 side by the first ring part 65.

The first surfaces and the second surfaces are each, for example, a region within 10 mm, a region within 8 mm, a region within 5 mm, a region within 3 mm, or a region within 2 mm, from the end surface (side surface) of a corresponding one of the lenses. A lower limit is, for example, not less than 0.5 mm, or not less than 1 mm.

[Material of Lens Barrel]

It is preferable that an aluminum alloy, for example, A5052 or A5056, be used as a material of the lens barrel 6. Such an aluminum alloy may be subjected to a satin treatment (treatment for making asperities). Further, the aluminum alloy may be used in a state of being black anodized. The material of the lens barrel 6 is not limited to the aluminum alloy. For example, the lens barrel 6 may be made of SUS304 (austenitic stainless steel), and black trivalent chromium plating may be applied to a surface layer.

[Cutout Parts]

As illustrated in an enlarged view of FIG. 3, the first lens 1 and the second lens 2 have respective cutout parts 1*d* and 2*d*. Specifically, the first lens 1 has the cutout part 1*d* on a second surface 1*b* side. The second lens 2 has the cutout part 2*d* on a first surface 2*a* side. The cutout part 1*d* is formed at a corner part of the second surface 1*b*, and the cutout part 2*d* is formed at a corner part of the first surface 2*a*. Each of the cutout parts 1*d* and 2*d* is a tilted surface that forms a given angle (for example, approximately 45 degrees) with respect to the optical axis. That is, each of the cutout parts 1*d* and 2*d* is formed by C-chamfering. Note that it is possible to adjust the depth and the width of each of the cutout parts 1*d* and 2*d* by adjusting the above angle as appropriate.

Any one of the first lens 1 and the second lens 2 only needs to have a cutout part. Alternatively, both of the first lens 1 and the second lens 2 may have respective cutout parts.

Each of the cutout parts 1*d* and 2*d* is preferably formed all around the corner part of a corresponding one of the second surface 1*b* and the first surface 2*a*. This makes it easy to firmly integrate the first lens 1 and the second lens 2. Each of the cutout parts 1*d* and 2*d* may be intermittently formed along the circumferential direction of the corner part of a corresponding one of the second surface 1*b* and the first surface 2*a*.

Each of the cutout parts 1*d* and 2*d* has a width of preferably 1 mm to 5 mm or 2 mm to 4 mm in the lens radius direction. In this case, it is possible to bring a portion of the second surface 1*b* in which portion the cutout part 1*d* is not formed (lens surface on the second surface 1*b* side) and a portion of the first surface 2*a* in which portion the cutout part 2*d* is not formed (lens surface on the first surface 2*a* side) into good contact with each other. Thus, the first lens 1 and the second lens 2 are unlikely to be integrated in a state where the second lens 2 is tilted with respect to the first lens 1.

Each of the cutout parts 1*d* and 2*d* has a width of preferably 1 mm to 5 mm or 2 mm to 4 mm in the lens optical axis direction. In this case, it is possible to bring the portions of the lens end surfaces, in which portions the cutout parts 1*d* and 2*d* are not respectively formed, into good contact with the lens barrel 6. This makes it easy to suppress occurrence of a tilt error during mounting of the lenses on the lens barrel 6.

[Integration of Lenses]

The first lens 1 and the second lens 2 are integrated by the adhesive 12 that is introduced to the cutout parts 1*d* and 2*d*. In other words, the first lens 1 and the second lens 2 are integrated by the adhesive 12 that is introduced to a space (gap 20) formed by the cutout parts 1*d* and 2*d*. The above configuration makes it possible to prevent inclusion of an impurity between the lenses.

The adhesive 12 can be an adhesive that is generally used for adhesion. For example, in terms of classes based on curing methods of adhesives, adhesives of an ultraviolet curing type, a heat curing type, a solvent vaporizing type, an anaerobically curing type, a curing agent mixture type, and combinations thereof can be used. From the viewpoint of versatility, adhesives of an ultraviolet curing type and a heat curing type are preferably used.

The adhesive 12 is preferably not introduced, except the cutout parts 1*d* and 2*d*, between respective surfaces of the first lens 1 and the second lens 2 which surfaces face each other in the optical axis direction. That is, the portion in which the cutout part 1*d* is not formed and the portion in which the cutout part 2*d* is not formed are preferably in direct contact with each other. This makes it unlikely for the first lens 1 and the second lens 2 to be integrated in a state where the second lens 2 is tilted with respect to the first lens 1.

When the lenses are viewed from an end surface direction, the area of the adhesive 12 that is introduced to the cutout parts 1*d* and 2*d* is preferably not less than 10% and not more than 100% or not less than 10% and not more than 90%, with respect to the areas of the cutout parts 1*d* and 2*d*. This makes it unlikely for the adhesive 12 to ooze from the cutout parts 1*d* and 2*d*, and occurrence of a tilt error which results from the adhesive 12 is easily suppressed.

The volume of the adhesive 12 that is introduced to the cutout parts 1*d* and 2*d* is preferably not less than 10% and not more than 100% or not less than 10% and not more than 90% of the volumes of the cutout parts 1*d* and 2*d*. In other words, the volume of the adhesive 12 that is introduced to the space (gap 20) formed by the cutout parts 1*d* and 2*d* is preferably not less than 10% and not more than 100% or not less than 10% and not more than 90% of the volume of the gap 20. This suppresses oozing of the adhesive 12 from the gap 20, and makes it easy to suppress occurrence of a tilt error which results from the adhesive 12. It is preferable that the adhesive 12 is in contact with the cutout parts 1*d* and 2*d* and is not in contact with the lens barrel 6. This makes it easy to suppress occurrence of a tilt error during mounting of the lenses on the lens barrel 6.

[Optical Axis Thicknesses of and Interval Between Lenses]

In the present embodiment, the effective diameter of the first lens 1 is larger than the effective diameter of the third lens 3. The optical axis thickness t3 of the third lens 3 is greater than the optical axis thickness of each of the first lens 1 and the second lens 2. These configurations allow good resolution to be achieved in a case where the lens unit 4 is used as imaging lens.

The optical axis thickness t3 of the third lens 3 is preferably 0.5 times to 2 times a second distance d2 that is a distance on the optical axis between the second lens 2 and the third lens 3 (distance between respective surfaces of the second lens 2 and the third lens 3 which surfaces face each other). In this case, the optical system 100 has a high MTF in each of a tangential direction and a sagittal direction at the spatial frequency of 41.7 cycles/mm.

That is, the lens unit 4 has such good resolution as to be used for an image sensor that is for an infrared region and that has a pixel pitch substantially equal to a wavelength. That the MTF at the above-described spatial frequency is high means having such good resolution as to be used for an image sensor that has a narrow pitch substantially equal to a wavelength.

A first distance d1 that is a distance on the optical axis between the first lens 1 and the second lens 2 is preferably shorter than the second distance d2. In this case, a numerical aperture (NA) on an image side becomes higher, and it is possible to reduce the RMS radius of a concentrated spot on the image plane.

The ratio of the second distance d2 to the first distance d1 is preferably not more than 9.

[Materials of Lenses]

Examples of a material of each of the lenses include germanium (Ge), silicon (Si), chalcogenide glass, zinc selenide (ZnSe), and zinc sulfide (ZnS). The chalcogenide glass contains 20% to 90% of tellurium (Te) by mol %, and preferably contains at least any one of 0% to 50% of germanium (Ge) and 0% to 50% of gallium (Ga). Note that the amount of the Te is preferably 30% to 88%, 40% to 84%, 50% to 82%, and particularly preferably 60% to 80%. Absorption of light by the chalcogenide glass is very little over a wide wavelength range of the infrared region, i.e., the wavelength range of 7 μm to 14 μm, and tends to have a good internal transmittance at least in the above wavelength range. An internal transmittance refers to a transmittance inside the material, and does not include a reflection loss on a surface of the material. Specifically, in a case of a thickness of 2 mm, the chalcogenide glass is capable of achieving an internal transmittance of not less than 90%, particularly not less than 95%, at a wavelength of 10 μm. Such chalcogenide glass was developed by the applicant of the present application (see PCT International Publication, No. WO2020/105719A1).

The Abbe number of the chalcogenide glass at a wavelength of 10 μm is preferably not less than 100 or not less than 150, and particularly preferably not less than 200. The Abbe number (ν10) is calculated by an expression below. Application of the chalcogenide glass having the above Abbe number makes it possible to suppress chromatic aberration.

$$\nu 10 = (\text{refractive index at wavelength of } 10\ \mu\text{m} - 1) / (\text{refractive index at wavelength of } 8\ \mu\text{m} - \text{refractive index at wavelength of } 12\ \mu\text{m})$$

The refractive index of the chalcogenide glass at a wavelength of 10 μm is preferably 2.5 to 4.0, 2.74 to 3.92, or 2.8 to 3.8, and particularly preferably 2.9 to 3.7. In a case where the refractive index is low, it is necessary to cause the radius of curvature of a lens to be smaller than that of a lens made of a material having a high refractive index. This is likely to result in an increase in the degree of difficulty in processing the lens. Furthermore, there is a possibility that an optical degree of freedom is impaired, e.g., the thickness in the direction of the optical axis becomes greater.

The chalcogenide glass preferably does not contain a toxic substance such as As, Se, or Tl. This makes it possible to reduce an environmental load.

The third lens 3 is preferably made of a material which has, at a wavelength of 10 μm, an internal transmittance that is equal to or higher than the internal transmittance of a material of which the second lens 2 is made and that is equal to or higher than the internal transmittance of a material of which the first lens 1 is made. The above configuration causes an image formed by the optical system 100 to have good resolution. For example, in a case of a thickness of 2 mm, the internal transmittance of the material of which the third lens 3 is made is preferably not less than 90% and particularly preferably not less than 95% at a wavelength of 10 μm. For example, the third lens 3 is preferably made of the above-described chalcogenide glass.

The third lens 3 is preferably made of the chalcogenide glass having a refractive index of 2.5 to 4.0 at a wavelength of 10 μm. The above configuration causes an image formed by the optical system 100 to have good resolution.

The second lens 2 is preferably made of the chalcogenide glass having a refractive index of 2.5 to 4.0 at a wavelength of 10 μm. The above configuration causes an image formed by the optical system 100 to have better resolution.

The first lens 1 is preferably made of germanium. In this case, the first lens 1 has good durability and good hardness.

[Shapes of Lenses]

Each of the lenses of the lens unit 4 preferably has the following configuration. The first lens 1 preferably has positive power and has a meniscus shape in which a second lens 2 side of the first lens 1 is concave. The second lens 2 preferably has negative power. The third lens 3 preferably has positive power and has a meniscus shape in which a second lens 2 side of the third lens 3 is convex. These configurations make it possible to cause the lens unit to be compact.

[Coating Film]

At least one of the first lens 1 and the second lens 2 preferably has a coating film on a surface thereof, and each of the lenses, including the third lens, more preferably has the coating film on a surface thereof. The coating film is formed for the purpose of (i) reducing reflection on a lens surface and thereby improving a transmittance, (ii) protecting the lens surface, etc. The coating film is preferably made of at least one selected from germanium (Ge), silicon (Si), fluorides, zinc selenide (ZnSe), zinc sulfide (ZnS), and diamond-like carbons. For example, it is more preferable that the first lens 1 has the coating film and the coating film contains a diamond-like carbon. In this case, the first lens 1 has good durability and good hardness. Note that the lens which does not have the coating film may be included.

Each of the circumferential edge parts 1*c*, 2*c*, and 3*c* preferably has, on a portion which is in contact with the lens barrel 6 and/or at least one of the ring parts, a region in which the coating film is not attached (non-attachment region). For example, at least one of the first surfaces 1*a* and 3*a* and the second surfaces 2*b* and 3*b* preferably has the non-attachment region.

In a case where a displacement, thickness nonuniformity, protrusion, etc. of a coating film occurs on a lens, the lens may be tilted with respect to the lens barrel 6 when the lens is accommodated and fixed in the lens barrel 6. In a case where such a tile occurs, a tilt error which results from the coating film may occur. By a configuration in which the non-attachment region is in direct contact with the lens barrel 6 and/or at least one of the ring parts, it is possible to suppress a tilt of each of the lenses which tilt results from the coating film.

The portion of the second surface 1*b* in which portion the cutout part 1*d* is not formed and the portion of the first surface 2*a* in which portion the cutout part 2*d* is not formed each preferably have the non-attachment region. This makes it unlikely for the first lens 1 and the second lens 2 to be integrated in a state where the second lens 2 is tilted with respect to the first lens 1.

Each of the circumferential edge parts preferably has the non-attachment region on a lens surface which is in contact with (locked by) the lens barrel 6. In the present embodiment, the lens surface of the circumferential edge part which lens surface is locked by the lens barrel 6 is the second surface 3*b*. This makes it easy to suppress occurrence of a tilt error.

Each of the lenses particularly preferably has the non-attachment region on each of a corresponding one of the first surfaces 1*a*, 2*a*, and 3*a* and a corresponding one of the second surfaces 1*b*, 2*b*, and 3*b*. In this case, it becomes easy to effectively suppress occurrence of a tilt error.

The thickness of the coating film is preferably not less than 1 μm. As the thickness of the coating film becomes greater, a tilt error more easily occurs. Therefore, the above configuration makes it possible to effectively suppress occurrence of a tilt error. The upper limit of the thickness of the coating film is preferably not more than 5 μm.

The flange part of each of the lenses has a width of preferably not less than 2 mm, more preferably not less than 5 mm in the lens radius direction. According to the above configuration, it becomes easy to fix each of the lenses to the lens barrel 6 and/or at least one of the ring parts, and occurrence of a tilt error is easily suppressed. An upper limit can be, for example, not more than 10 mm or not more than 9 mm.

The outer diameter of each of the lenses is preferably not less than 10 mm and not more than 100 mm. The lenses each of which has such an outer diameter easily bring about the effect of the present invention, because a tilt error tends to greatly affects optical properties. In a case where the outer diameter of each of the lenses is less than 10 mm, it is difficult to have the non-attachment region while ensuring an optical effective diameter. In a case where the outer diameter of each of the lenses is more than 100 mm, the effect of suppressing a tilt error by the non-attachment region becomes small.

It is preferable that each of the circumferential edge parts has the non-attachment region formed all around the each of the circumferential edge parts. Here, that "each of the circumferential edge parts has the non-attachment region formed all around the each of the circumferential edge parts" means that each of the circumferential edge parts has the non-attachment region continuously formed in the circumferential direction of the each of the circumferential edge parts. According to the above configuration, occurrence of a tilt error during mounting of each of the lenses is effectively suppressed.

The non-attachment region is a region that radially extends preferably not less than 1 mm, more preferably not less than 1.5 mm, from the end surface (side surface) of each of the lenses. By having the non-attachment region in the above region, occurrence of a tilt error is effectively suppressed.

[Diaphragm]

The first lens 1 may have the diaphragm 8 that is located to a side of the first lens 1 which side is opposite from the second lens 2 in the direction of the optical axis (see FIG. 1). The ratio of the diameter of the diaphragm 8 to the effective diameter of an image is preferably 3 to 4.5. This configuration causes the NA on the image side to be high in a case where the lens unit 4 is an imaging lens (first lens unit 4). In a case where the lens unit 4 is an objective lens (second lens unit 5), an NA on an object plane side becomes high.

[Shapes of Surfaces of Lenses]

At least one of respective surfaces of the first lens 1 and the second lens 2 which surfaces face each other may be a diffraction surface. Specifically, at least one of optical surfaces on the second surface 1*b* side and the first surface 2*a* side may be a diffraction surface. The first lens 1 and the second lens 2 are integrated. Therefore, even in a case where each of the optical surfaces which face each other on an inner side is a diffraction surface, breakage and contamination of the diffraction surface do not occur and aberration is also suppressed. Moreover, it is possible to provide a lens unit in which chromatic aberration is more unlikely to occur. A level difference between a concave and a convex of the diffraction surface can be designed, as appropriate, depending on the wavelength of light to be diffracted. For example, in a case where light in the infrared region is diffracted, the level difference between the concave and the convex is preferably 1 μm to 10 μm or 2 μm to 9 μm. In this case, chromatic aberration is more easily suppressed.

An optical surface of the third lens 3 which optical surface is located on a second surface 3*b* side may be an aspherical surface. Typically, the second surface 3*b* side is disposed at a position at which misalignment is unlikely to occur. Therefore, a tilt error is unlikely to occur when the lens is mounted on the lens barrel 6, even in a case where the optical surface is an aspherical surface. In this case, since the second surface b has the non-attachment region, a tilt error is more unlikely to occur.

[NA]

In a case where the lens unit 4 is an imaging lens, the NA on the image side preferably satisfies not less than 0.35. The NA on the image side is directly connected to resolution. Therefore, the resolution of the optical system 100 is improved.

<Modification 1 of Lens Unit>

Figure 5:
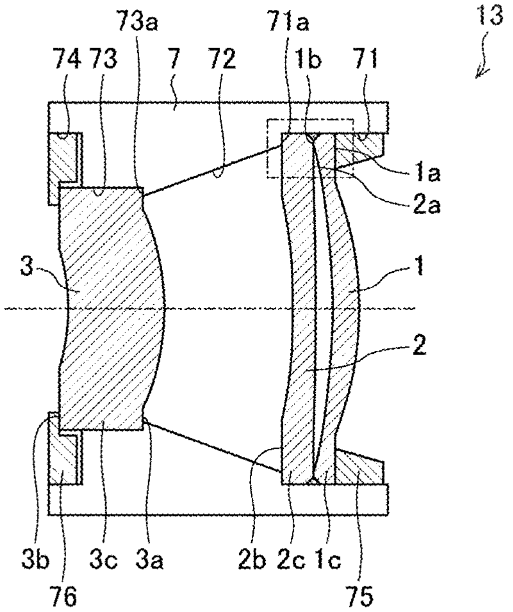
FIG. 5 is a cross-sectional view illustrating a state where a lens unit of Modification 1 is accommodated and fixed in a lens barrel.
Figure 5:
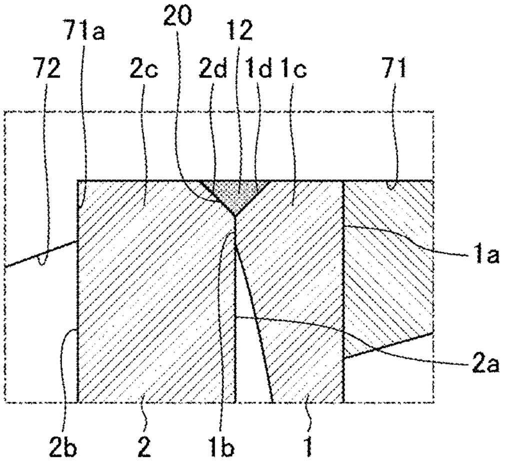

A lens unit 13 of Modification 1 is described below. FIG. 5 is a cross-sectional view illustrating a state where the lens unit 13 of Modification 1 is accommodated and fixed in a lens barrel 7. The lens unit 13 includes a first lens 1, a second lens 2, a third lens 3, the lens barrel 7, a first ring part 75, and a second ring part 76.

The lens barrel 7 includes a first hole 71, a second hole 72, a third hole 73, and a fourth hole 74. The first hole 71 is connected to the second hole 72, and has a diameter larger than that of the second hole 72. The first hole 71 has a locking part 71*a*. The second hole 72 is a tapered hole, and the first hole 71 and the third hole 73 are connected with the second hole 72 therebetween. The third hole 73 is connected to the fourth hole 74, and has a diameter smaller than that of the fourth hole 74. The third hole 73 has a locking part 73*a*.

The second ring part 76 is fitted in the fourth hole 74. The third lens 3 is fitted in the third hole 73. In the first hole 71, the second lens 2, the first lens 1, and the first ring part 75 are fitted in order from a third lens 3 side. The ring parts 75 and 76 cause the lenses to be located at respective given positions in the lens barrel 7 or fix the lenses at respective given positions on an optical axis in the lens barrel 7. Specifically, the first ring part 75 presses a circumferential edge part (first surface 1*a*) of the first lens 1 which circumferential edge part (first surface 1*a*) is not in contact with the second lens 2. The second ring part 76 presses a circumferential edge part (second surface 3*b*) of the third lens 3 which circumferential edge part (second surface 3*b*) is not in contact with the lens barrel 7.

The lenses are fixed in a state where respective circumferential edge parts 1*c*, 2*c*, and 3*c* of the lenses are each in contact with the lens barrel 7 and/or at least one of the ring parts 75 and 76. In the present modification, the third lens 3 is fixed in a state where the second surface 3*b* is pressed by the second ring part 76 and a first surface 3*a* is locked by the locking part 73*a*. The second lens 2 is fixed in a state where a second surface 2*b* is locked by the locking part 71*a* and a first surface 2*a* is in contact with the first lens 1. The first lens 1 is fixed in a state where a second surface 1*b* is in contact with the second lens 2 and the first surface 1*a* is pressed by the first ring part 75. That is, each of the lenses of the lens unit 13 is accommodated and fixed in the lens barrel 7 by being pressed from a first lens 1 side by the first ring part 75 and being pressed from a third lens 3 side by the second ring part 76.

As illustrated in an enlarged view of FIG. 5, the first lens 1 has a cutout part 1*d* on the second surface 1*b*, and the second lens 2 has a cutout part 2*d* on the first surface 2*a*. Each of the cutout parts 1*d* and 2*d* is formed at a corner part of a corresponding one of the second surface 1*b* and the first surface 2*a*, and is a tilted surface that forms a given angle (for example, approximately 45 degrees) with respect to the optical axis. That is, each of the cutout parts 1*d* and 2*d* is formed by C-chamfering. Note that it is possible to adjust the depth and the width of each of the cutout parts 1*d* and 2*d* by adjusting the above angle as appropriate.

Each of the cutout parts 1*d* and 2*d* is preferably formed all around the corner part of a corresponding one of the second surface 1*b* and the first surface 2*a*. This makes it easy to firmly integrate the first lens 1 and the second lens 2. Each of the cutout parts 1*d* and 2*d* may be intermittently formed along the circumferential direction of the corner part of a corresponding one of the second surface 1*b* and the first surface 2*a*.

Each of the cutout parts 1*d* and 2*d* has a width of preferably 1 mm to 5 mm or 2 mm to 4 mm in the lens radius direction. In this case, it is possible to bring a portion of the second surface 1*b* in which portion the cutout part 1*d* is not formed and a portion of the first surface 2*a* in which portion the cutout part 2*d* is not formed into good contact with each other. Thus, the first lens 1 and the second lens 2 are unlikely to be integrated in a state where the second lens 2 is tilted with respect to the first lens 1.

Also in the present modification, a coating film is preferably formed on each of surfaces of the lenses, and each of the circumferential edge parts of the lenses preferably has a non-attachment region. By bringing such a non-attachment region into direct contact with the lens barrel 7 and/or at least one of the ring parts, it is possible to suppress a tilt of each of the lenses which tilt results from the coating film. That is, in the present modification, occurrence of a tilt error which results from the coating film is easily suppressed.

Each of the circumferential edge parts preferably has the non-attachment region on a portion which is in contact with the lens barrel 7 and/or at least one of the ring parts. For example, at least one of the first surfaces 1*a* and 3*a* and the second surfaces 2*b* and 3*b* preferably has the non-attachment region.

For example, in a case where a displacement, thickness nonuniformity, protrusion, etc. of a coating film occurs on a lens, the lens may be tilted with respect to the lens barrel 7 when the lens is accommodated and fixed in the lens barrel 7. In a case where such a tile occurs, a tilt error which results from the coating film may occur. By the non-attachment region being in direct contact with the lens barrel 7 and/or at least one of the ring parts, it is possible to suppress a tilt of each of the lenses which tilt results from the coating film.

The portion of the second surface 1*b* in which portion the cutout part 1*d* is not formed and the portion of the first surface 2*a* in which portion the cutout part 2*d* is not formed each preferably have the non-attachment region. This makes it unlikely for the first lens 1 and the second lens 2 to be integrated in a state where the second lens 2 is tilted with respect to the first lens 1.

Each of the circumferential edge parts preferably has the non-attachment region on a lens surface which is in contact with (locked by) the lens barrel 7. In the present embodiment, the lens surfaces of the circumferential edge parts which lens surfaces are locked by the lens barrel 7 are the second surface 2*b* and the first surface 3*a*. This makes it easy to suppress occurrence of a tilt error.

At least one of respective surfaces of the first lens 1 and the second lens 2 which surfaces face each other may be a diffraction surface. In this case, it is possible to provide a lens unit in which chromatic aberration is more unlikely to occur.

<Modification 2 of Lens Unit>

Figure 6:
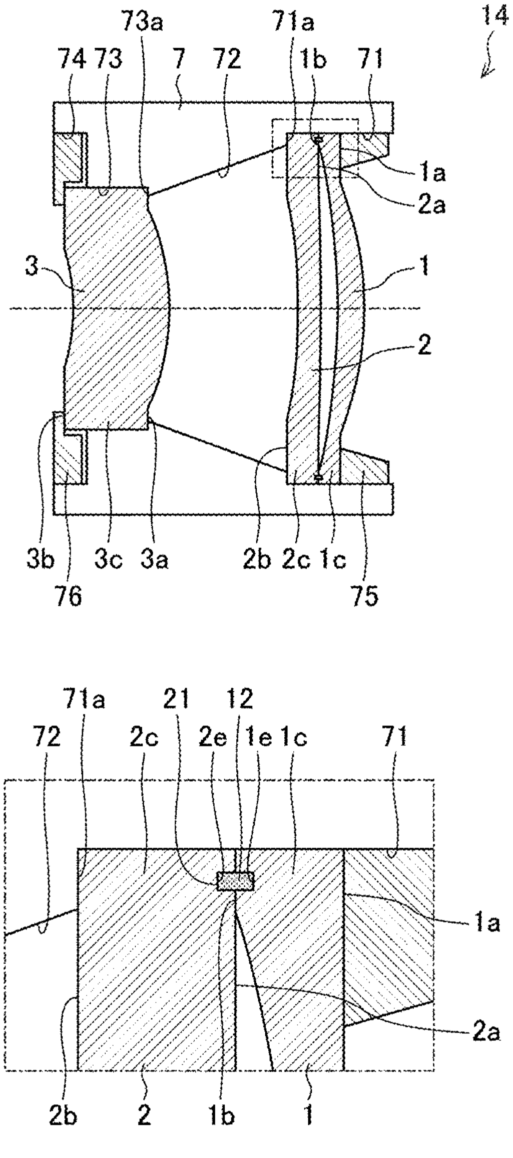
FIG. 6 is a cross-sectional view illustrating a state where a lens unit of Modification 2 is accommodated and fixed in a lens barrel.

A lens unit 14 of Modification 2 is described below. FIG. 6 is a cross-sectional view illustrating a state where the lens unit 14 of Modification 2 is accommodated and fixed in a lens barrel 7. Parts in FIG. 6 which are the same as those in FIG. 5 are given the same reference signs, and description of the parts will be omitted.

As illustrated in an enlarged view of FIG. 6, a first lens 1 has, as a cutout part, a groove part 1*e* that is located slightly to an optical axis side from an end surface of a second surface 1*b* and that extends in the direction of an optical axis. A second lens 2 has a groove part 2*e* that is located slightly to an optical axis side from an end surface of a first surface 2*a* and that extends in the direction of the optical axis. The first lens 1 and the second lens 2 are integrated by an adhesive 12 that is introduced to a space (gap 21) formed by aligning openings of the groove parts 1*e* and 2*e*.

Each of the groove parts 1*e* and 2*e* is preferably formed all around a corresponding one of the second surface 1*b* and the first surface 2*a*. Each of the groove parts 1*e* and 2*e* may be intermittently formed along the circumferential direction of a corresponding one of the second surface 1*b* and the first surface 2*a*.

Each of the groove parts 1*e* and 2*e* has a width of 0.5 mm to 5 mm, more preferably 0.5 mm to 3 mm in the lens radius direction. In this case, it is possible to bond the first lens 1 and the second lens 2 well and possible to bring a portion of the second surface 1*b* in which portion the groove part 1*e* is not formed and a portion of the first surface 2*a* in which portion the groove part 2*e* is not formed into good contact with each other. Thus, the first lens 1 and the second lens 2 are unlikely to be integrated in a state where the second lens 2 is tilted with respect to the first lens 1. Circumferential edge parts 1*c* and 2*c* are each not limited to a case of having the groove part at a single position, and may each have a plurality of groove parts. Alternatively, any one of the circumferential edge parts 1*c* and 2*c* may have the groove part.

<Spectral Characteristic Device>

Figure 7:
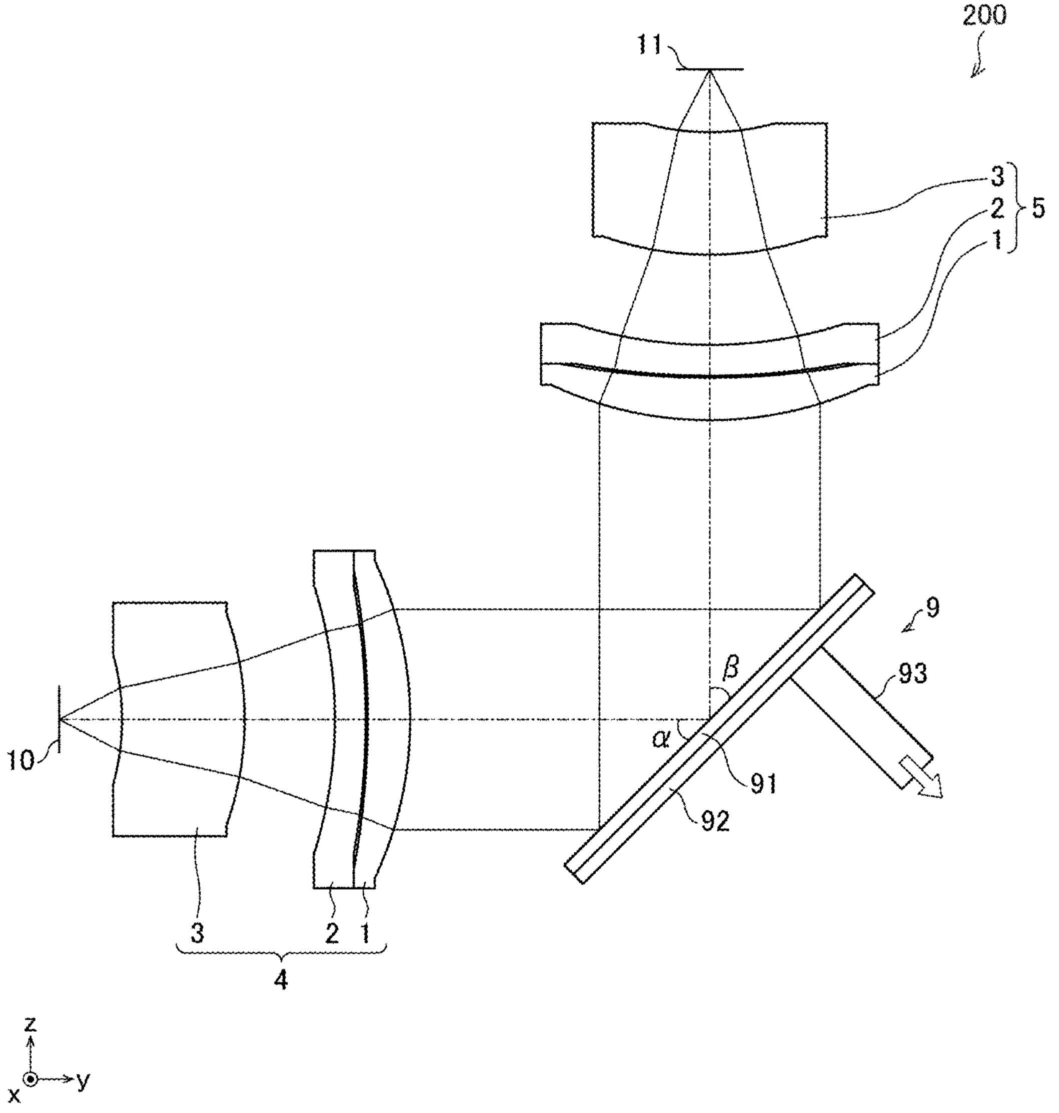
FIG. 7 is a cross-sectional view illustrating a spectral characteristic measurement device to which lens units in accordance with an embodiment are applied.

FIG. 7 is a cross-sectional view illustrating a spectral characteristic measurement device 200 to which lens units in accordance with an embodiment are applied. The spectral characteristic measurement device 200 includes a lens unit 4, a lens unit 5, a sample support plate 10, a detecting section 11, and a phase shifter 9. The configurations of the lens unit 4 and the lens unit 5 of the spectral characteristic measurement device 200 are similar to those of the lens unit 4 and the lens unit 5 of the optical system 100.

In the spectral characteristic measurement device 200, a third lens 3 of the lens unit 4 is disposed so as to face the sample support plate 10, and a third lens 3 of the lens unit 5 is disposed so as to face the detecting section 11. The phase shifter 9 is disposed between the lens unit 4 and the lens unit 5. The optical axis of the lens unit 4 and the optical axis of the lens unit 5 are perpendicular to each other in the phase shifter 9. In the spectral characteristic measurement device 200, the optical axis is bent perpendicularly in the phase shifter 9 of a reflection type. However, a basic optical configuration is the same as that of the above-described optical system 100 of a transmission type. The phase shifter 9 is disposed in a vicinity of the position of a diaphragm 8 of the optical system 100. That is, the lens unit 4 and the lens unit 5 are disposed symmetrically with respect to the phase shifter 9.

In the present embodiment, the spectral characteristic measurement device 200 employs the phase shifter 9 of a reflection type. The phase shifter 9 includes a fixed mirror section 91, a movable mirror section 92, and a driving section 93. The fixed mirror section 91 and the movable mirror section 92 are disposed so as to be arranged in the direction perpendicular to the drawing surface of FIG. 6 (direction of an x axis) in a state where the movable mirror section 92 is located on a far side of the direction of the x axis with respect to the fixed mirror section 91. The fixed mirror section 91 and the movable mirror section 92 are disposed so as to be tilted a degrees (approximately 45 degrees) with respect to the optical axis of the lens unit 4. The fixed mirror section 91 and the movable mirror section 92 are disposed so as to be tilted degrees (approximately 45 degrees) with respect to the optical axis of the lens unit 5. The movable mirror section 92 is configured such that the movable mirror section 92 can be moved in the direction perpendicular to a surface of the movable mirror section 92. This causes a phase difference between a first light beam that has been reflected by the fixed mirror section 91 and a second light beam that has been reflected by the movable mirror section 92. Note that the phase shifter 9 is not limited the reflection type, and may be of a transmission type.

Infrared light is emitted from a light source (not illustrated) toward a sample (not illustrated) in a state where the sample is supported on the sample support plate 10. The infrared light is scattered by various components of the sample, and the scattered light enters the third lens 3 of the lens unit 4. The scattered light is caused to be a collimated light beam by the lens unit 4. The collimated light beam reaches the fixed mirror section 91 and the movable mirror section 92 of the phase shifter 9. A part of the light is reflected by the fixed mirror section 91, and enters a first lens 1 of the lens unit 5 as a first light beam. The remaining part of the light is reflected by the movable mirror section 92, and enters the first lens 1 of the lens unit 5 as a second light beam. The first light beam and the second light beam that have entered the lens unit 5 cause an image to be formed on a light receiving surface of the detecting section 11, so that an interferogram (change in imaging intensity (change in intensity of interference light)) is formed.

In a case where a phase difference is caused to the first light beam and the second light beam by moving the movable mirror section 92, a waveform of an interferogram is obtained. By Fourier transform of the interferogram, a spectral characteristic of the sample is obtained. The spectral characteristic measurement device 200 includes lens units of an aspect of the present invention. Therefore, it is possible to suppress a tilt error during mounting of lenses. Furthermore, an image formed in the detecting section 11 has good resolution. This makes it possible to obtain a spectral characteristic of a sample.

<Recap>

A first aspect of the present invention is a lens unit which is used for an infrared region that includes at least any one of wavelengths in a range of 7 μm to 14 μm, the lens unit including: a first lens; and a second lens, wherein a circumferential edge part of at least one of the first lens and the second lens has a cutout part, and the first lens and the second lens are integrated by an adhesive that is introduced to the cutout part. According to the above configuration, since the first lens and the second lens are integrated, it is possible to prevent inclusion of an impurity between the lenses. Moreover, since the adhesive is introduced to the cutout part of the circumferential edge part of at least one of the lenses, it is possible to prevent entry of the adhesive between surfaces of the lenses, and possible to suppress a tilt error which results from the adhesive.

A second aspect of the present invention is arranged such that, in the first aspect, at least one of respective surfaces of the first lens and the second lens which surfaces face each other is a diffraction surface. The first lens and the second lens are integrated. Therefore, even in a case where each of the surfaces which face each other is a diffraction surface, breakage and contamination of the diffraction surface do not occur, and it is possible to reduce aberration.

A third aspect of the present invention is arranged such that, in the first or second aspect, the cutout part is formed at a corner part of the circumferential edge part, and is a tilted surface that forms a given angle with respect to an optical axis. According to the above configuration, it is possible to sufficiently introduce the adhesive to the cutout part without oozing.

A fourth aspect of the present invention is arranged such that, in the third aspect, the cutout part has a width of 1 mm to 5 mm in a lens radius direction. According to the above configuration, it is possible to bring portions of the circumferential edge parts of the first lens and the second lens 2 in each of which portions the cutout part is not formed into good contact with each other. Thus, the first lens 1 and the second lens 2 are unlikely to be integrated in a state where the second lens 2 is tilted with respect to the first lens 1.

A fifth aspect of the present invention is arranged such that, in any one of the first through fourth aspects, the cutout part is a groove part formed in the circumferential edge part. According to the above configuration, the adhesive is introduced to the cutout part without oozing.

A sixth aspect of the present invention is arranged such that, in any one of the first through fifth aspects, a volume of the adhesive that is introduced to the cutout part is not less than 50% and not more than 100% of a volume of the cutout part. According to the above configuration, it is possible to suppress occurrence of a tilt error which results from oozing of the adhesive.

A seventh aspect of the present invention is arranged such that, in any one of the first through sixth aspects, the adhesive is not introduced, except the cutout part, between respective surfaces of the first lens and the second lens which surfaces face each other in a direction of an optical axis. According to the above configuration, occurrence of a tilt error is suppressed.

An eighth aspect of the present invention is arranged such that, in any one of the first through seventh aspects, at least one of the first lens and the second lens has a coating film. According to the above configuration, reflection on a surface of at least one of the lenses is reduced, and the surface is protected.

A ninth aspect of the present invention is arranged such that, in the eighth aspect, the first lens has the coating film, and the coating film contains a diamond-like carbon. According to the above configuration, good durability and good hardness are achieved.

A tenth aspect of the present invention is arranged such that, in any one of the first through ninth aspects, the first lens is made of germanium. According to the above configuration, good durability and good hardness are achieved.

An eleventh aspect of the present invention is arranged so as to, in any one of the first through tenth aspects, further include: a lens barrel; and a third lens, wherein the first lens, the second lens, and the third lens are accommodated and fixed in the lens barrel, an effective diameter of the first lens is larger than an effective diameter of the third lens, and an optical axis thickness of the third lens is greater than an optical axis thickness of each of the first lens and the second lens. According to the above configuration, it is possible to suppress a tilt error during mounting of the lenses. Therefore, in a case where the lens unit is applied to a spectral characteristic measurement device, an image formed in a detecting section has good resolution, and a spectral characteristic of a sample is easily obtained.

A twelfth aspect of the present invention is arranged such that, in the eleventh aspect, the optical axis thickness of the third lens is 0.5 times to 2 times a second distance which is a distance on an optical axis between the second lens and the third lens. According to the above configuration, an NA on an image side becomes high, and it is possible to reduce the RMS radius of a concentrated spot. Moreover, it is possible to reduce chromatic aberration.

A thirteenth aspect of the present invention is arranged such that, in the eleventh or twelfth aspect, a first distance which is a distance on an optical axis between the first lens and the second lens is shorter than a second distance which is a distance on the optical axis between the second lens and the third lens. According to the above configuration, the NA on the image side becomes high, and it is possible to reduce the RMS radius of a concentrated spot.

A fourteenth aspect of the present invention is arranged such that, in any one of the eleventh through thirteen aspects, the lens barrel has a first hole, a second hole, and a third hole; the third lens is fitted in the third hole; the second hole is connected to the third hole, the second hole has a diameter larger than a diameter of the third hole, and the second lens and the first lens are fitted in the second hole in a state where a second ring part intervenes between the second lens and the third lens; and the first hole is connected to the second hole, the first hole has a diameter larger than the diameter of the second hole, and a first ring part that presses the first lens is fitted in the first hole. According to the above configuration, the lens unit is compactly accommodated.

A fifteenth aspect of the present invention is arranged such that, in the fourteenth aspect, at least one of (i) a portion of the third lens which portion is in contact with the lens barrel and/or the first ring part, (ii) a portion of the second lens which portion is in contact with the first ring part, and (iii) a portion of the first lens which portion is in contact with the second ring part has a region in which a coating film is not attached. According to the above configuration, occurrence of a tilt error which results from the coating film is suppressed during mounting.

A sixteenth aspect of the present invention is arranged such that, in any one of the eleventh through thirteenth aspects, the lens barrel has a first hole, a second hole, a third hole, and a fourth hole; the first hole and the third hole each have a locking part which locks a corresponding one of the circumferential edge part of the second lens and a circumferential edge part of the third lens; the fourth hole is connected to the third hole, the fourth hole has a diameter larger than a diameter of the third hole, and a second ring part that presses the third lens is fitted in the fourth hole; the fourth hole and the second hole connected are with the third hole therebetween, and the third lens is fitted in the third hole in a state where the third lens is locked by the locking part; the third hole and the first hole are connected with the second hole therebetween; and the first hole is connected to the second hole, the first hole has a diameter larger than a diameter of the second hole, and the second lens, the first lens, and a first ring part are fitted in the first hole in order from a second hole side. According to the above configuration, the lens unit is compactly accommodated.

A seventeenth aspect of the present invention is arranged such that, in the sixteenth aspect, at least one of (i) a portion of the third lens which portion is in contact with the second ring part and/or the locking part, (ii) a portion of the second lens which portion is in contact with the locking part, and (iii) a portion of the first lens which portion is in contact with the first ring part has a region in which a coating film is not attached. According to the above configuration, occurrence of a tilt error which results from the coating film is suppressed during mounting.

An eighteenth aspect of the present invention is arranged such that, in any one of the eleventh through seventeenth aspects, the third lens is made of chalcogenide glass which has a refractive index of 2.5 to 4.0 at a wavelength of 10 μm. According to the above configuration, the third lens has a high transmittance.

A nineteenth aspect of the present invention is arranged such that, in any one of the eleventh through eighteenth aspects, the second lens is made of chalcogenide glass which has a refractive index of 2.5 to 4.0 at a wavelength of 10 μm. According to the above configuration, the second lens has a high transmittance.

A twentieth aspect of the present invention is arranged such that, in the eighteenth or nineteenth aspect, the chalcogenide glass contains 20% to 80% of Te by mol %.

[Supplementary Note]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 First lens
2 Second lens
3 Third lens
1*a*, 2*a*, 3*a* First surface
1*b*, 2*b*, 3*b* Second surface
1*c*, 2*c*, 3*c* Circumferential edge part
1*d*, 2*d* Cutout part
1*e*, 2*e* Groove part
4 First lens unit
5 Second lens unit
13, 14 Lens unit
6, 7 Lens barrel
61, 71 First hole
62, 72 Second hole
63, 73 Third hole
74 Fourth hole
63*a* Edge part
65, 75 First ring part
66, 76 Second ring part
71*a*, 73*a* Locking part
8 Diaphragm
9 Phase shifter
91 Fixed mirror section
92 Movable mirror section
93 Driving section
10 Sample support plate
11 Detecting section
12 Adhesive
20, 21 Gap
100 Optical system
200 Spectral characteristic measurement device
S Image plane
T Object plane
t3 Optical axis thickness
d1 First distance
d2 Second distance

The invention claimed is:

1. An optical system which is used for an infrared region that includes at least any one of wavelengths in a range of 7 μm to 14 μm, said optical system comprising:

two lens units disposed so as to be symmetrical to each other with respect to a diaphragm, each of the two lens units including a first lens;

a second lens;

a third lens; and a lens barrel, wherein the first lens, the second lens, and the third lens are accommodated and fixed in the lens barrel in order from a diaphragm side, an effective diameter of the first lens is larger than an effective diameter of the third lens, an optical axis thickness of the third lens is greater than an optical axis thickness of each of the first lens and the second lens, a circumferential edge part of at least one of the first lens and the second lens has a cutout part, and the first lens and the second lens are integrated by an adhesive that is introduced to the cutout part.

2. The optical system as set forth in claim 1, wherein at least one of respective surfaces of the first lens and the second lens which surfaces face each other is a diffraction surface.

3. The optical system as set forth in claim 1, wherein the cutout part is a groove part formed in the circumferential edge part.

4. The optical system as set forth in claim 1, wherein a volume of the adhesive that is introduced to the cutout part is not less than 10% and not more than 100% of a volume of the cutout part.

5. The optical system as set forth in claim 1, wherein the adhesive is not introduced, except the cutout part, between respective surfaces of the first lens and the second lens which surfaces face each other in a direction of an optical axis.

6. The optical system as set forth in claim 1, wherein the first lens is made of germanium.

7. The optical system as set forth in claim 1, wherein the optical axis thickness of the third lens is 0.5 times to 2 times a second distance which is a distance on an optical axis between the second lens and the third lens.

8. The optical system as set forth in claim 1, wherein a first distance which is a distance on an optical axis between the first lens and the second lens is shorter than a second distance which is a distance on the optical axis between the second lens and the third lens.

9. The optical system as set forth in claim 1, wherein the second lens is made of chalcogenide glass which has a refractive index of 2.5 to 4.0 at a wavelength of 10 μm.

10. The optical system as set forth in claim 1, wherein the third lens is made of chalcogenide glass which has a refractive index of 2.5 to 4.0 at a wavelength of 10 μm.

11. The optical system as set forth in claim 10, wherein the chalcogenide glass contains 20% to 80% of Te by mol %.

12. The optical system as set forth in claim 1, wherein the cutout part is formed at a corner part of the circumferential edge part, and is a tilted surface that forms a given angle with respect to an optical axis.

13. The optical system as set forth in claim 12, wherein the cutout part has a width of 1 mm to 5 mm in a lens radius direction.

14. The optical system as set forth in claim 1, wherein at least one of the first lens and the second lens has a coating film.

15. The optical system as set forth in claim 14, wherein
the first lens has the coating film, and
the coating film contains a diamond-like carbon.

16. The optical system as set forth in claim 1, wherein:
- the lens barrel has a first hole, a second hole, and a third hole;
- the third lens is fitted in the third hole;
- the second hole is connected to the third hole, the second hole has a diameter larger than a diameter of the third hole, and the second lens and the first lens are fitted in the second hole in a state where a second ring part intervenes between the second lens and the third lens; and
- the first hole is connected to the second hole, the first hole has a diameter larger than the diameter of the second hole, and a first ring part that presses the first lens is fitted in the first hole.

17. The optical system as set forth in claim 16, wherein at least one of (i) a portion of the third lens is in contact with the lens barrel and/or the second ring part, (ii) a portion of the second lens is in contact with the second ring part, and (iii) a portion of the first lens is in contact with the first ring part has a region in which a coating film is not attached.

18. The optical system as set forth in claim 1, wherein:
- the lens barrel has a first hole, a second hole, a third hole, and a fourth hole;
- the first hole and the third hole each have a locking part which locks a corresponding one of the circumferential edge part of the second lens and a circumferential edge part of the third lens;
- the fourth hole is connected to the third hole, the fourth hole has a diameter larger than a diameter of the third hole, and a second ring part that presses the third lens is fitted in the fourth hole;
- the fourth hole and the second hole are connected with the third hole therebetween, and the third lens is fitted in the third hole in a state where the third lens is locked by the locking part;
- the third hole and the first hole are connected with the second hole therebetween; and
- the first hole is connected to the second hole, the first hole has a diameter larger than a diameter of the second hole, and the second lens, the first lens, and a first ring part are fitted in the first hole in order from a second hole side.

19. The optical system as set forth in claim 18, wherein at least one of (i) a portion of the third lens is in contact with the second ring part and/or the locking part, (ii) a portion of the second lens is in contact with the locking part, and (iii) a portion of the first lens is in contact with the first ring part has a region in which a coating film is not attached.

* * * * *